United States Patent [19]
Littmann

[11] Patent Number: 5,229,180
[45] Date of Patent: Jul. 20, 1993

[54] LASER SCORED PACKAGE

[75] Inventor: Richard Littmann, Neenah, Wis.

[73] Assignee: American National Can Company

[21] Appl. No.: 771,977

[22] Filed: Oct. 2, 1991

[51] Int. Cl.⁵ .............................................. B65D 65/28
[52] U.S. Cl. .................. 428/43; 219/121.68; 219/121.69; 428/209
[58] Field of Search ...................... 219/121.68, 121.69; 428/43, 209, 458; 83/879, 880; 493/344–347, 355, 396, 400–403, 380–382, 341, 188

[56] References Cited

U.S. PATENT DOCUMENTS

| | | | |
|---|---|---|---|
| 3,626,143 | 12/1971 | Fry | 219/121.69 |
| 3,812,002 | 5/1974 | Lurie | 428/43 |
| 4,363,841 | 12/1982 | Snow | 428/461 |
| 4,762,514 | 8/1988 | Yoshida | 219/121.69 |
| 4,818,588 | 4/1989 | Okabe | 428/204 |
| 4,931,134 | 6/1990 | Hatkevitz | 219/121.69 |
| 5,074,675 | 12/1991 | Osgood | 493/187 |

Primary Examiner—Bruce M. Kisliuk
Assistant Examiner—Jack Lavinder
Attorney, Agent, or Firm—Mary J. Schnurr

[57] ABSTRACT

A structure for use in making an easy open package comprises a thermoplastic sheet material. The sheet material has a strip of reflective metal on one surface. Over the metal strip on the opposite surface of the sheet material is a score line. The score line may be formed by a laser. The metal strip reflects the laser and provides a score line of more uniform depth and also provides barrier properties in the area of the score line.

12 Claims, 2 Drawing Sheets

LASER SCORED PACKAGE

Many of today's products are contained in plastic sheets which are fabricated into packages. Since these packages must undergo stress when being filled by the packer and being when transported and by the consumer, there is a great need to make stronger packages which are less susceptible to opening prematurely. In addition, many of today's packaged food products are susceptible to moisture and/or oxygen permeation, Therefore there is also a need for packages that possess barrier properties.

Many packages in today's marketplace are made of relatively thin plastic, either in a single layer or made from a multilayer film. Packers are in search for a thin but durable film which is also economically efficient with regards to reducing the cost of the materials needed for making the package.

Multilayer laminates may be comprised of layers of any one or more number of thermoplastic material such as polyethylene, polypropylene, saran, ethylene vinyl alcohol etc. and blends thereof. In addition, the thermoplastic layers may have adhesives or tie layers which facilitate a strong bond between the layers and avoid problems due to delamination.

One of the problems frequently encountered in the use of plastic packaging is incurred in opening the package. Because structural integrity and prevention of tears, rips or other premature intrusions into the package are not desired, these plastic packages are made so that the film is not easily opened. As a result it is frequently necessary to open these package by means of teeth, scissors, knives, ripping, pulling apart, etc. Still, it is difficult to open many packages and in many cases these opening means are disruptive of the packaging and cause the product to spill. At times the package can become so destroyed that the packaging can no longer be reused to store leftovers. When a tool is necessary to open the packaging, there are problems regarding the availability of the tool and time lost with respect to locating the tool.

In view of the problems in opening plastic packages, there have been a number of attempts to solve the problems. These attempts have taken a variety of approaches such as an opening notch such as a V or U shaped notch, a tearing zone see e.g. U.S. Pat. Nos. 4,934,245 and 3,404,988. In addition, plastic zippers can be used to open plastic packages. These opening means do not completely solve the problem however and there is still a need for an easy opened package.

Other attempts to solve packaging problems include: U.S. Pat. No. 3,693,785 which relates to a wrapping material containing regenerated cellulose which has a portion thereof that is more frangible than the remainder thereof; U.S. Pat. No. 3,986,640 that deals with a flexible package having a cut pattern, which when bent along the cut pattern, causes the package to open and the flowable contents therein to dispense. U.S. Pat. No. 4,217,327 which relates to forming a score line along a predetermined line in the surface of a plastic film to form a tear line. and U.S. Pat. No. 4,236,652 which relates to a package having a cut score area to rupture open the package upon bending.

Notches, cut patterns or tear lines can produce an opening which is easily propagated without any control. Further, notches, cut patterns, or tear lines produce areas of weakness in the package, which, when stressed accidentally, e.g., during handling or shipping, can become an unintended opening which is easily propagated. That is, these proposals have not adequately resolved the problem of initiating an opening only when desired and of controlling the opening across the entire package.

Furthermore, these proposals have presented manufacturing problems. For instance, the problem of properly locating the notch, cut pattern or tear line in a position where the consumer desires to open the package. If not properly positioned, the resulting package can be worse than if no such notch, cut pattern or tear line had been provided. The consumer must still resort to a sharp object to open the package, but it is weakened at some point (due to the mispositioned notch, cut pattern, or tear line). In addition, opening features such as those on cigarette packs require a separate opening tape which means that it is more costly to manufacture the package because it requires a separate material (the tape) and a complicated process.

Roughening an area of the package is another type of proposal to open a package without the need for a cutting instrument. U.S. Pat. No. 3,313,642 relates to a process of modifying the surface properties of polyolefin film.

U.S. Pat. No. 4,778,058 provides a pouch from a film of two plastic layers. A discreet area of the first layer, corresponding to a folded portion of the resultant pouch, is surface roughened prior to lamination to the second layer. The irregularities from roughening are filled with the plastic material of the second plastic layer. The two-layered film is heat-sealed into a pouch. The surface roughening is at a position on the first layer of the film other than the portion thereof to be heat sealed. While U.S. Pat. No. 4,778,058 may provide for tear initiation, it still fails to provide for control of the tear as is desired by the end user.

U.S. Pat. No. 4,543,279 relates to a film product, such as a sealed bag, wound film or adhesive tape having a plurality of random scratches or cuts formed along the edges and oriented toward the other side of the film. In a bag of U.S. Pat. No. 4,543,279, the scratches are formed on the longitudinal edge portion of the bag, outside of the seals thereof, or on the longitudinal edge portion outside of the seal and on a central line inside the seal. While placing scratches on a central line inside the seal may provide for tear initiation, the placement of the scratches outside of the seals may not adequately provide for tear initiation as the user must still rip through the seals. And no provision is made for tear control.

U.S. Pat. No. 3,608,815 relates to an opening aid for packages made from at least one oriented material. The opening aid consists of minutely expanding the oriented material at a plurality of points within an area pattern which will be a fold of the package. U.S. Pat. No. 3,608,815 simply provides tear initiation like the previously discussed notch or cut techniques. However, U.S. Pat. No. 3,608,815 chalks up tear control to the nature of the materials of the package, stating that oriented materials "tear in an essentially straight line" while cellophane will tear without directional control. Thus, U.S. Pat. No. 3,608,815 does not adequately provide tear control.

Japanese Utility Model Publication No. 54-22484, published Aug. 6, 1979 (Application No. 50,68727 dated May 23, 1975; Early Disclosure No. 51-150915, dated Dec. 2, 1976), relates to a bag having seals with tear-initiating lines. The tear initiating lines consist of ordered, successively smaller pinholes or notches extending from the outer edge of the seal and terminating at the center of the seal so that the inner half of the seal is the same as an ordinary seal. It is stated in this publication that the holes or notches are not to extend all the way into the enclosed part of the bag, i.e., across the entire width of the seal, because to do so will impair the strength and the airtightness of the seal. Further, this publication poses manufacturing problems which it leaves unaddressed. To effect the tear-initiating line, the films of the bag must be selectively cut or notched. The cuts or notches are organized along lines and are of varying size and extend only through one half of the seal. Thus, this publication calls for a very complicated manufacturing process.

Japanese Patent Publication No. 51,48775, published Dec. 22, 1976 (Application No. 49-49804 dated May 7, 1974; Early disclosure No. 51-16346, dated Feb. 9, 1976), deals with placing minute scars, embossment or scratches along the center line of a laminate plastic film which is then slit lengthwise along the center line to make two adhesive tapes. The problems of tear initiation and tear control in the opening of packages are not addressed in this publication.

Bowen, U.S. Pat. Nos. 3,909,502 and 3,790,744, Fry, U.S. Pat. No. 3,626,143, Ang, U.S. Pat. No. 4,549,063, Josephy, U.S. Pat. No. 4,356,375, Yoshida, U.S. Pat. No. 4,762,514 and U.S. Pat. No. 5,001,325 Huizinga all relate to laser scoring and each of these U.S. patents is hereby incorporated herein by reference.

Bowen, U.S. Pat. No. 3,790,744 relates to forming one line of weakness in at least one but not all layers of a multilayer structure by preferentially vaporizing with a beam of radiant energy a line in at least one layer which is not the most proximate layer in relation to the source of radiant energy. Bowen, U.S. Pat. No. 3,909,582, deals with forming a line of weakness defining a tear path in a multilayer laminate by scoring with a beam of radiant energy the most proximate layer in relation to the source of radiant energy. There is no suggestion of a metal strip in the area of the score line to aid the laser in forming the proper score line.

U.S. Pat. No. 5,001,325 to Huizinga merely discloses a metallized film having as one of the layers a layer of metal. There is no teaching in the Huizinga patent of the use of a metallized strip to focus the laser beam to improve the scoring of the multilayer laminate.

Fry, U.S. Pat. No. 3,626,143, similarly relates to focusing a single beam of laser light upon a thermoplastic substrate so as to form a score. Fry fails to teach or suggest a strip of metal under the score line to improve scoring.

Ang, U.S. Pat. No. 4,549,063 deals with forming a crack and peel feature on the backing of an adhesive laminate by providing the backing with one or more non-linear, discontinuous, preferably sine-wave geometric pattern, lines, preferably by a laser. Ang fails to teach or suggest a strip of metal under the score line to provide an easy-open feature to a package.

Although, scoring of a plastic material has been known as discussed above, one of the problems encountered in scoring is in controlling the depth of the score line. Frequently, the score line is not cut to an accurate depth and therefore the remaining plastic material may be too thick or too thin. Another problem in scoring is in packages where products sensitive to oxygen are contained. Many multilayer packages contain barrier layers comprised of, for example, a foil layer, ethylene vinyl alcohol or polyvinylidene chloride copolymers.

Barrier layers are used in the packaging of oxygen sensitive or moisture sensitive products. These products deteriorate if subjected to oxygen or moisture. When a score line is placed in a multi-layer film containing these sensitive products there is a risk that the scoring will cut through the barrier leaving an area of the package unprotected from air or moisture.

SUMMARY OF THE INVENTION

It has now been surprisingly discovered that superior laser-scored packages may be prepared according to the present invention. According to the present invention, there is provided a sheet material which is preferably a multi-layer sheet material although single layer materials can also be used.

In the present invention a thermoplastic sheet material having an upper and lower surface is provided with a metal strip on the lower surface of the sheet material. The metal strip may be, for example, a metal foil, a thin layer of metal formed by vapor deposition, or a bead, ribbon or strip of metal ink.

When the sheet material is scored with a laser, the laser cuts through a portion of the upper surface of the sheet material. In addition, when the laser hits the metal, the beam is reflected back while cutting through a portion of the lower surface of the plastic sheet material.

The presence of the metal provides a more uniform score line that can easily be opened by a purchaser of the product without undue difficultly. In addition, the presence of the metal insures that there is no portion of the sheet material which no longer has barrier material to protect the product.

DETAILED DESCRIPTION OF THE INVENTION

Figure 1:
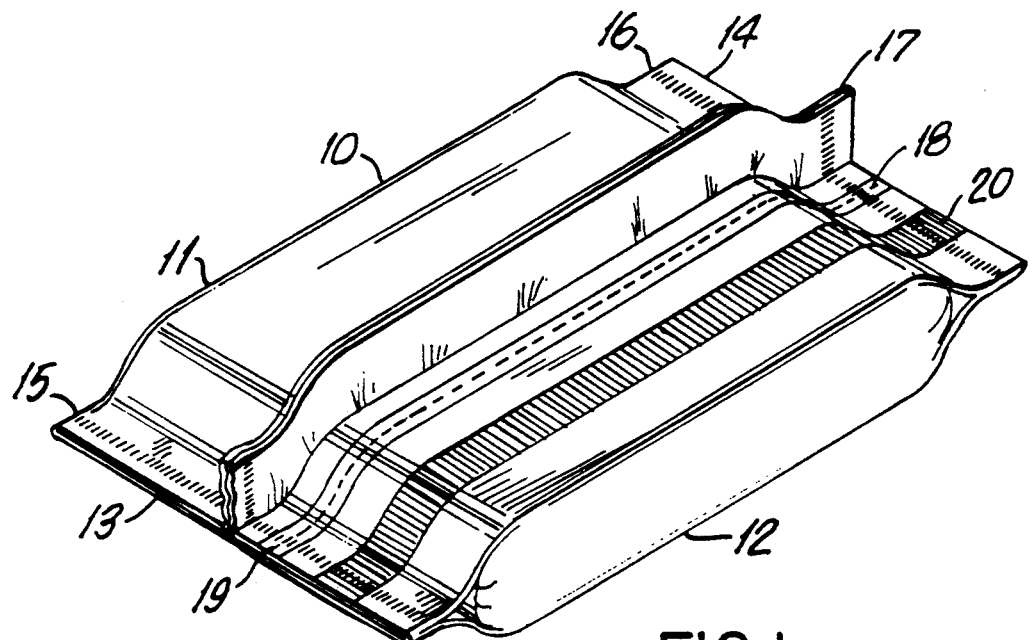
FIG. 1 is a perspective view of a package of the present invention.

As shown in FIG. 1, a pillow-shaped package 10 has longitudinal sides 11 and 12 and a transverse side 13 and 14. Although a pillow-shaped package is shown in FIG. 1, the present invention is applicable to virtually any type of package which may be opened by a score line. The pillow shaped package may be of any cross-section such as square, rectangular, circular, triangular, etc. End seals 15 and 16 are provided along the transverse side 13 and 14 of the package. These end seals may be heat sealed or formed with the use of adhesives. Package 10 is generally formed from a single sheet of material which is folded to form the package. However, it can be formed of more than one sheet of materials with additional seals provided. The opposing ends of the sheet material are sealed together in a face to face relationship to form a fin seal 17. The fin seal can be formed by a heat seal or an adhesive seal as are the end seals. In addition, any type of sealing means can be used to form the seal. The package of the present invention may have one or more fin seals depending on the shape of the product and the number of sheets used to make the package.

The sheet material which is used to make the package has an upper and lower surface. The lower surface of the sheet material is provided with a strip of metal. This metal strip is preferably reflective on the surface facing the upper surface of the sheet material. This metal strip may be a sheet of foil, or a thin layer of metal formed by vapor deposition of a metal on the lower surface of the sheet material. Alternatively, the metal may be deposited on a second sheet of thermoplastic material and the second sheet can be adhered to the first by conventional laminating techniques. Also the metal strip may be buried in other layers of the laminate as is necessary due to the packaging needs of the product. Another method of providing a metal strip is by the use of a metallized ink such as an aluminum or silver ink to print a strip. The metals chosen for the strip are selected based on their ability to reflect light. The greater the reflectance of the metal the more desirable the material is for the metal strip. Metal inks that are suitable for use in this invention include the inks sold by Color Converting Industries. The ink may be a water based or solvent based ink. The ink may be printed on the surface by either a roto- or flexo-system. Preferably, the metal strip should be about ¼ wide although the width may vary.

The metal strip aids in the cutting of the film by the laser and in addition, maintains the oxygen and moisture barrier properties of the film. For example, one product frequently packaged in plastic is cheese which is susceptible to drying and/or a cheese mold and the use of the metal strip under the laser eliminates the risk of such problems.

During formation of the package the sheet material is scored by a laser or other suitable means in an area that is above the metal strip. In the package of FIG. 1 the metal strip 19 is provided adjacent to the fin seal 17 and the laser forms a score line 18 that is generally parallel to the fin seal 17. However, it will be recognized by those skilled in the art that the location of the metal strip and the score line many vary with the particular package.

The sheet material may also be provided with an adhesive strip such as an adhesive-based reclosable tape 20 The adhesive-based reclosable tape is placed adjacent to the score line 18 and opposite the fin seal 17. This two sided adhesive is preferably a tape having differential adhesive strength between the two sides, a tape which one side of the adhesive is more adhesive than the other. Such a tape is a XD2273 tape sold by MacTac. The differential adhesion between the two sides of the tape permit the tape to adhere to the surface of the package and not to be removed when the fin is lifted to reopen the package.

Figure 2:
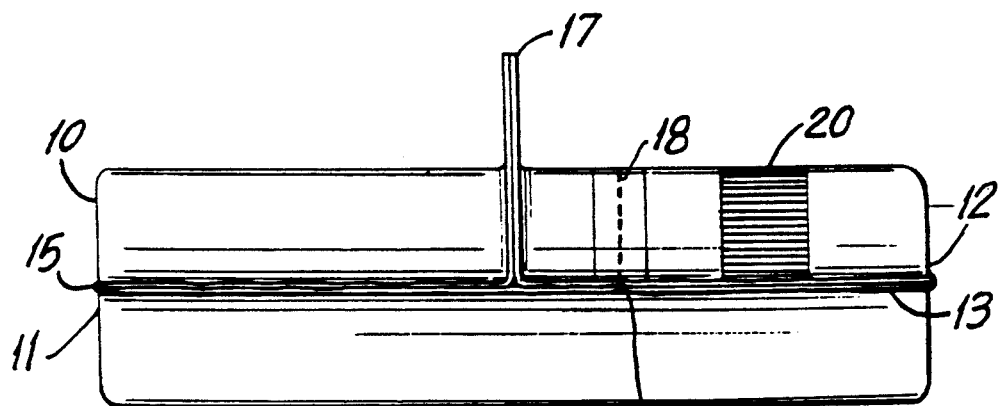
FIG. 2 is the side view of the package of FIG. 1.

FIG. 2 is a side view of the packages of FIG. 1 showing edge 13 with end seal 15. Fin seal 17 is formed by the sealing of opposite ends of the sheet material in a face to face relationship.

Figure 3:
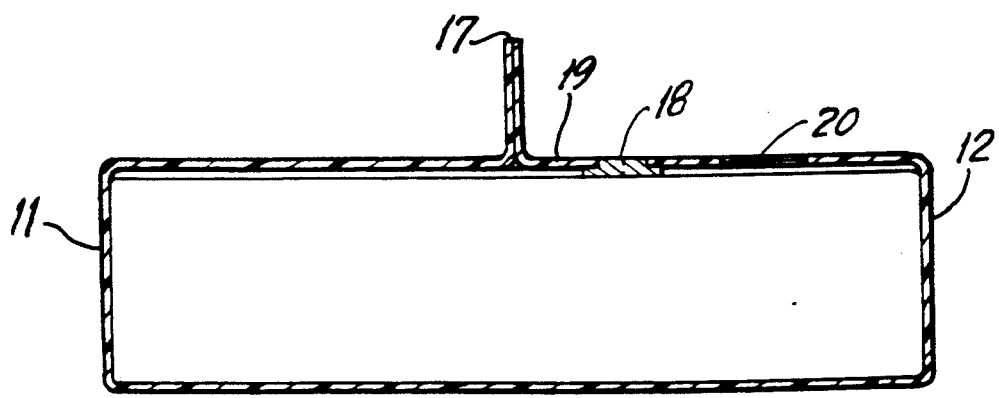
FIG. 3 is a cross sectional view of the package of FIG. 1.

As shown in FIG. 3 the size of the fin seal 17 and the placement of the reclosable tape are interrelated since the fin seal must be a size sufficient to fold onto the tape to reseal the package after opening.

In the operation of the package, the consumer pulls on the fin seal to open the package along the score line. After the product has been used the package can be resealed by folding over the fin seal 17 onto the adhesive.

Figure 4:
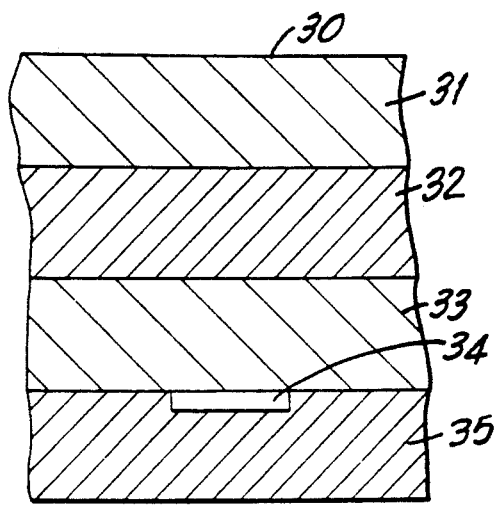
FIG. 4 is a cross sectional view of a laminate useful for the package of FIG. 1.

FIG. 4 shows cross sectional view of a laminate 30 useful for the package of FIG. 1. Layer 31 is the outer layer of the laminate and may be a heat-sealable, thermoplastic material. Layer 32 can be a layer such as ethylene vinyl alcohol, vinylidene chloride, copolymers or foil. Layer 33 may be a thermoplastic material. Metal strip 34 is provided on the underside of layer 33. Layer 35 may be a heat sealable thermoplastic material. Preferably, in the absence of layer 35 the metal strip is covered with a coating of for example ethylene vinyl alcohol. It will be appreciated by those skilled in the art that the teachings of the present invention are applicable to many types of multi-layer structures which can be scored such as containers, tubes, pouches, bottles, lidstock, etc.

Figure 5:
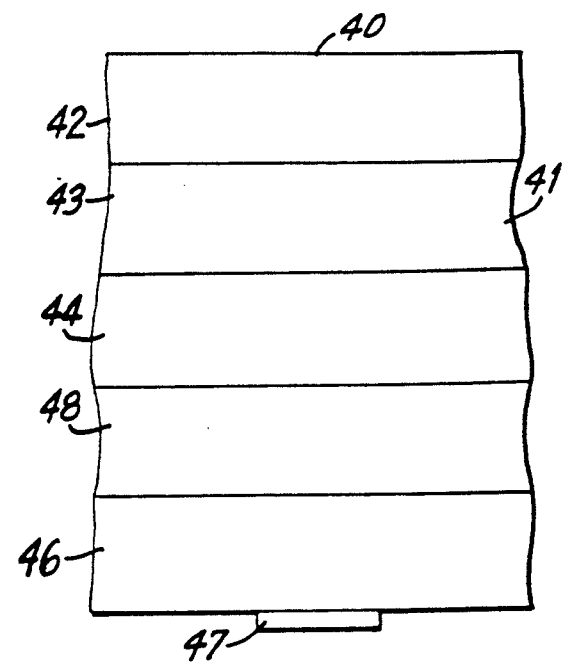
FIG. 5 is a cross sectional view of a preferred laminate for the package of FIG. 1.

A preferred laminate structure is shown in FIG. 5. The laminate 40 is comprised of a first laminate 41 which comprises outer layers 42 and 44 of a polyvinylidene chloride copolymer with a center layer 43 of oriented polypropylene.

The second sheet 46 is comprised of a layer of polyethylene terepthalate (PET) or a polyethylene such as low density polyethylene which has a metal strip 47 thereon. This laminate is coated with EVA. The two sheets 41 and 46 are joined together by a tie or adhesive layer 48 of ethyl methyl acrylate (EMA), ethylene acrylic acid (EAA).

In an alternative structure, the outer layer is oriented polypropylene and the second layer is the tie for example, of EMA or EAA layer. The third and fifth layers are a polyvinylidene chloride copolymer layer the fourth layer is OPP. The fifth layer of PVDC copolymer is metallized and coated with an EVA coating.

Figure 6:
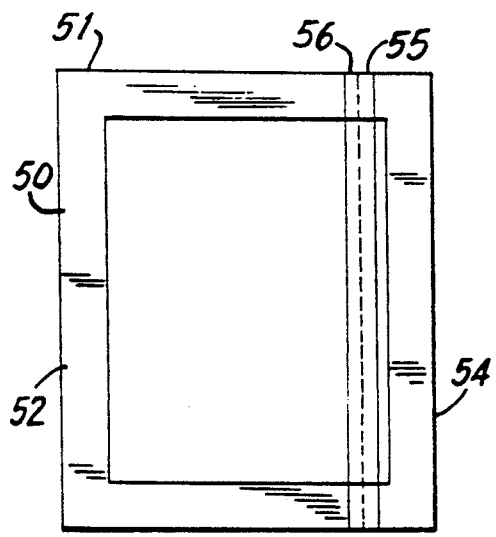
FIG. 6 is a perspective view of a pouch of the present invention.

FIG. 6 shows a pouch 50 which has end seals 51, 52, 53, 54 on each end of the pouch. The pouch is provided with a metallized strip 55 in the laminate and score line 56 across the length of the pouch and above the metallized strip.

Figure 7:
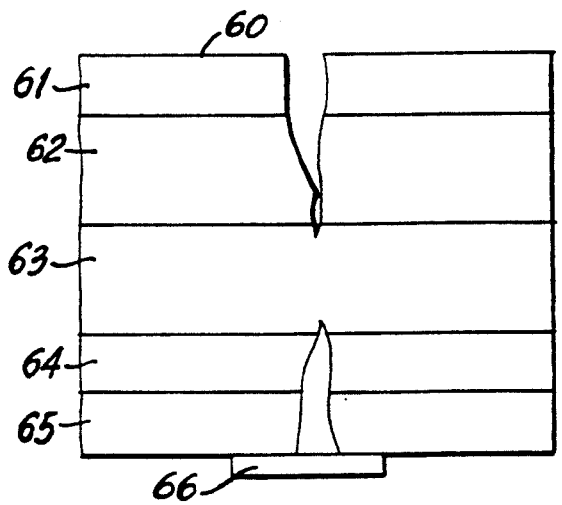
FIG. 7 is a side view of a laminate after the laminate has been scored by a laser.

FIG. 7 showns a side view of a laminate after the laminate has been scored by the laser. The laminate 60 is a five layer laminate with an outer layer 61 and a barrier layer 62. There is a core layer 63, a tie layer 64, and inner layer 65. Metal strip 66 is on the inner layer 65. The laser cuts through the outer layer 61, barrier layer 62, and into core layer 63. As the laser is reflected off of the metal strip 66, it cuts through inner layer 65 and a portion of layer 64. The amount or depth of scoring will vary with the materials selected for use in the sheet material and on the intensity of the laser. In the Figures the metal strip has been shown thicker than is necessary. Only a thin layer such as that found in vapor deposition or a printing ink is necessary.

The sheet material may be comprised of any suitable material, such as a thermoplastic polyolefin. Suitable polyolefins include polyethylene, polypropylene, and polyesters. The polyethylene may include, for example, low density polyethylene (LDPE), medium density polyethylene (MDPE), high density polyethylene (HDPE), linear low density polyethylene (LLDPE), very low density polyethylene (VLDPE) and ultra low density polyethylene (ULDPE). The polyester may include polyethylene terepthalate (PET). The polypropylene may include oriented polypropylene (OPP). In addition, the sheet material may be comprised of a multilayered laminate material. As discussed above, a preferred embodiment of the present invention is the use of a two layered laminate where one layer is polyester and the other layers is polypropylene. However, the multilayered laminate may be comprised of layers of any of the above listed materials.

Furthermore, in addition to the above-disclosed preferred multilayer or film structures, other films (of either single or multilayers), structures or laminates preferably comprising polymeric and/or thermoplastic materials can be formed into an easy-open, tear control package (including pouch) in accordance with this invention. Suitable materials for such other films, structures or laminates or layers thereof can be almost any materials conventionally used in the art, e.g., metal foil, vinylidene chloride copolymers, propylene ethylene copolymer (PPE), MXD6, nylon, high impact polystyrene (HIPS), ethylene vinyl alcohol (EVOH), ethylene butene copolymers (EB), polybutylene terephthalate (PBT), copolymers of PET or of PBT or CoPET or CoPBT, ethylene vinyl acetate (EVA) (in which case preferably a high VA content EVA, i.e., about 28-35% by weight VA EVA), (e.g., Exxon LD-761 or, inks, primers or ionomer resins, e.g., Surlyn (Du Pont), or the like, or mixtures thereof. In multilayer films or laminates, for some applications it may be preferred that at least one layer, such as an internal layer, comprise a barrier material.

In multilayer films, structures or laminates, a tie or an adhesive may also be present between the layers. Suitable materials for such tie layers or adhesives are known to the ordinary skilled artisan and may include, by way of example, anhydride modified polyolefins, (e.g., graft copolymer of maleic anhydride and propylene wherein maleic anhydride moities are grafted onto polypropylene chains) ethylene acrylic acid copolymers, ethylene methyl acrylate copolymers, blends or copolymers of PP and EVA, or other synthetic resinous materials. The selected adhesive should be stable under the conditions by which the packages of the invention are prepared or used. For additional information on adhesives, reference is made to U.S. patent application Ser. No. 07/458,489, filed Dec. 28, 1989. Commercially available products for layers in products of the invention include nylon 6; 11; 12; 6, 12; and 6, 66; ULTRAMIDKR 4600 (BASF), NOVAMID 2030 (Mitsubishi Chem. Co.), DURATHANE (Farbenfabriken Bayer A.G.), "1030" (Unitika, Japan) SYTEL SUPERTUFF 811 (Du Pont), "4018" (Huels, Germany), and ELY 1256 (Elmser Switzerland), Mylar, Dalar, Exxon 5610A-2 (blend of PP containing EVA), Admer (Mitsui, No. AT469C), Bynel (Du Pont E361 or 3036), Plezar 3342, and Surlyn. Admer, Bynel and Plexar are believed to be maleic anhydride modified polyolefins.

Films or layers in this invention, may be oriented, if desired, e.g., for a particular end use, by conventional processes, such as blown tubular orientation, stretch orientations, or molecular orientation. They may also be cross-linked by conventional processes such as by irradiation, heat, or the addition or cross-linking agents.

Vinylidene chloride copolymers as mentioned herein include vinylidene chloride vinyl chloride copolymers (VC, HB Sarans, Dow Chemical Co.), and vinylidene chloride methyl acrylate copolymers ("MA-PVDC copolymers") (MA Saran, Down 119, Dow Chemical Co. and MA-PVDC copolymers containing essentially no EVA, See U.S. application Ser. No. 07/458,848, filed Dec. 28, 1989, and incorporated herein by reference). As to polyvinylidene chloride films and methods of making and using them, attention is further directed to commonly owned U.S. patent applications Ser. Nos. 07/458,485, 07/458,489, and 07/458,490, all filed on Dec. 28, 1989, and each incorporated herein by reference. In MA-PVDC copolymers, the methyl acrylate is preferably present in an amount of about 3 to 8% by weight, more preferably form 6 to 8% by weight, based upon total weight. However, the methyl acrylate content can be up to 12% and even up to 15% in some instances. Vinylidene chloride copolymers, EVOH and metal (e.g., aluminum foil), are useful as barrier layers in multilayer film structures. These materials can be employed as an additional internal layer in the preferred structures disclosed herein, e.g., between the second and third or between the third and fourth layers of the first film structure herein, or anywhere beneath the second layer in the alternative film structure disclosed herein. A preferred structure in the present invention is comprised of a multilayer film having two outer layers of polyvinylidene chloride copolymer with a core layer of oriented polypropylene and which has been biaxially oriented. This film is generally available from Rayop, ICI and Hercules. This multi-layer laminate is sealed to a layer of low density polyethylene by an adhesive material such as ethyl methyl acrylate (EMA), or ethylene acrylic acid. The low density polyethylene is generally coated with an ethylene vinyl acetate sealant coating.

However, rather than using ink or an ink layer for printing on packages or pouches of this invention, any appropriate printing process can be employed., e.g., a rewinder which imprints appropriate characters into the film comprising polymeric and/or thermoplastic material. Packages and pouches of this invention can be heat or adhesive sealed. It has been found that the laser scoring herein across the entire width of a package, including across side seal thereof, when present, does not weaken or reduce the air-tightness of the so scored side seals.

Throughout this specification, reference has been or will be made to multilayer structures, films, film structures or laminates. These multilayer or film structures, films or laminates are the same thickness as conventional multilayer structures, films, film structures or laminates. Typical thicknesses of films and film structures can range from about 2.0 mils (0.051 mm) to 5 mils or more, with a normal range of about 0.5 to about 5.0 mils, preferably about 1.5 to about 3.0 mils (0.038–0.076 mm). Films thinner than about 1.5 mils (0.038 mm) may be too weak to perform their required function (although individual layers of multilayer structures may be thinner than about 1.5 mils, e.g., about 0.25 to about 1 mil). Laminates can be up to 10 mils thick and multilayer structures can include films, (even single layer films) films structures and laminates and can be up to 100 mils thick. "Structure" includes multilayer structure as used herein.

It should be understood that this invention is applicable to any process for forming films, film structures or laminates (which can then be formed into a package), including laminations, extrusions, coextrusion, blown extrusion, tubular water quench extrusion, extrusion coating, and the like, and combinations thereof. Likewise, the present invention is applicable to any process and apparatus for forming a package (so long as the package has a fin and at least a width thereof, preferably adjacent to the fin).

As to extrusion or coextrusion methods, an apparatus for making multiple layer sheet materials, reference is made to commonly owned U.S. patent application Ser. Nos. 07/458,486, 07/458,487, and 07/458,488, all filed on Dec. 28, 1989, and each incorporated herein by reference. And, as to blended film structures, reference is made to U.S. patent application No. 07/458,489, filed Dec. 28, 1989 and incorporated herein by reference. For further background on films and apparatus for producing them, reference is made to U.S. Pat. Nos. 3,477,099, 4,755,402, 3,558,330, 4,714,638, 4,842,791, 4,379,117, and 4,804,510 each of which being incorporated herein by reference.

With respect to means for opening packages, or to laser scoring, or to laminate structures, reference is made to the following:

U.S. Pat. Nos. 3,313,642, 3,404,988, 3,608,815, 3,626,143, 3,693,785, 3,790,744, 3,909,582, 3,925,591, 3,986,640, 4,172,915, 4,217,327, 4,236,652, 4,356,375, 4,407,873, 4,543,279, 4,549,063, 4,557,377, 4,571,340, 4,656,094, 4,698,246, 4,762,514, 4,765,999, 4,778,058, 4,784,885, 4,785,937, 4,788,105, 4,808,421, 4,834,245, 4,880,701, 4,894,115, 4,934,245; and, Japanese Utility Model Publications Nos. 54-22484 and 51-48775. Reference is also made to U.S. Pat. No. 4,681,781, German Patent Document 2803074, UL 973,109 and EPA 0357841.

Bowen, U.S. Pat. Nos. 3,909,502 and 3,790,744, Fry, U.S. Pat. No. 3,626,143, Ang, U.S. Pat. No. 4,549,063, Josephy, U.S. Pat. No. 4,356,375 and Yoshida, U.S. Pat. No. 4,762,514 all relate to laser scoring and each of these U.S. patents is hereby incorporated herein by reference.

Bowen, U.S. Pat. No. 3,790,744 relates to forming one line of weakness in at least one but not all layers of a multilayer structure by preferentially vaporizing with a beam of radiant energy a line in at least one layer which is not the most proximate layer in relation to the source of radiant energy. Bowen, U.S. Pat. No. 3,909,582, deals with forming a line of weakness defining a tear path in a multilayer laminate by scoring with a beam of radiant energy the most proximate layer in relation to the source of radiant energy.

Fry, U.S. Pat. No. 3,626,143, similarly relates to focusing a single beam of laser light upon a thermoplastic substrate so as to form a single score.

Any suitable adhesive may be used such as two sided tape or any other conventional adhesive. As discussed above the adhesive should be more aggressive to the package than the fin seal. the adhesive can also be applied by a tape or any other suitable means such as spraying. The width of the adhesive can vary but should be at least "about ¼"" or greater. In any event the width of the adhesive should be sufficient for the fin seal to have a sufficient adhesion. Generally, it is preferred that the adhesive be covered by a peelable strip to protect the adhesive from dust, moisture or debris that would have a deleterious effect on the ability of the fin seal to adhere to the package when it is folded over.

The score line may be either a single line or a pair of parallel lines as disclosed in U.S. application Ser. No. 07/720,121, the disclosures of which are incorporated herein by reference. The score line may extend across the entire surface of the packages including the area of the end seals. If the product is smaller than the entire length of the package the score line need not be the entire length of the package.

Where the score is caused by a laser it is important not to score too deeply in order to prevent premature rupturing of the package. In multi-layer laminated sheet materials the laser score extends through the first layer and into the second layer for a two layered film.

As stated above there can be a plurality of score lines to render the package more easily opened. The score line can be 1/16", ⅛" or 3/16" apart and naturally, the distance may be varied to suit the sheet material and the purposes of the pouch. The scores are preferably continuous but need not be. For example, the scores can be two cuts or a series of cuts.

What is claimed is:

1. A structure for use in making a package comprising a multi-layer thermoplastic sheet material having at least three laminated layers of thermoplastic material, said sheet having upper and lower surfaces and wherein said sheet has a strip of reflective metal on at least a portion of the lower surface of said sheet material, said upper surface of said sheet material having a score in the area above the strip of reflective metal, said score extending through the first layer of the thermoplastic sheet material and through the second layer of the thermoplastic sheet material, and into the third layer of the thermoplastic sheet material.

2. A structure according to claim 1 where said sheet material is scored with a laser.

3. A structure according to claim 1 wherein said sheet has two opposing sides and said metal strip extends from one side to the other.

4. A structure according to claim 3 wherein said metal strip is a metal foil.

5. A structure according to claim 3 wherein said metal strip is formed by vapor deposition.

6. A structure according to claim 3 wherein said metal strip is a metal ink.

7. A structure according to claim 3 wherein said metal strip has a coating of ethylene vinyl acetate.

8. A structure according to claim 1 wherein the score is continuous.

9. A structure according to claim 1 wherein the score is discontinuous.

10. A structure according to claim 1 wherein the score is a single line.

11. A structure according to claim 1 wherein the score is a pair of parallel lines.

12. A structure according to claim 1 wherein the score extends from one edge to the opposite edge.

* * * * *